(12) United States Patent
Shimoyama

(10) Patent No.: US 8,416,434 B2
(45) Date of Patent: Apr. 9, 2013

(54) COMMUNICATION TERMINAL APPARATUS AND FACSIMILE COMMUNICATION METHOD

(75) Inventor: Atsushi Shimoyama, Shizuoka (JP)

(73) Assignee: NEC Access Technica, Ltd, Shizuoka (JP)

( * ) Notice: Subject to any disclaimer, the term of this patent is extended or adjusted under 35 U.S.C. 154(b) by 1365 days.

(21) Appl. No.: 11/859,854

(22) Filed: Sep. 24, 2007

(65) Prior Publication Data

US 2008/0074705 A1 Mar. 27, 2008

(30) Foreign Application Priority Data

Sep. 25, 2006 (JP) ................................. 2006-258245

(51) Int. Cl.
*G06F 3/12* (2006.01)
*H04N 1/00* (2006.01)
*H04N 1/41* (2006.01)
*H04N 1/32* (2006.01)
*H04L 12/28* (2006.01)
*H04J 1/02* (2006.01)

(52) U.S. Cl. ........ 358/1.15; 358/400; 358/401; 358/404; 358/405; 358/407; 358/426.01; 358/468; 370/351; 370/431; 370/493; 709/220; 709/238

(58) Field of Classification Search ........................ None
See application file for complete search history.

(56) References Cited

U.S. PATENT DOCUMENTS

| 6,359,903 | B1 * | 3/2002 | Shimade et al. | 370/468 |
|---|---|---|---|---|
| 6,753,980 | B1 * | 6/2004 | Sakakura et al. | 358/440 |
| 7,627,097 | B2 * | 12/2009 | Kawabata et al. | 379/100.12 |
| 7,701,931 | B2 * | 4/2010 | Kajiwara | 370/356 |
| 7,755,806 | B2 * | 7/2010 | Tanimoto | 358/462 |
| 7,791,748 | B2 * | 9/2010 | Izumi et al. | 358/1.15 |
| 7,894,091 | B2 * | 2/2011 | Fujino | 358/1.15 |
| 8,037,138 | B2 * | 10/2011 | Izumi | 709/206 |
| 8,130,425 | B2 * | 3/2012 | Jackson | 358/476 |

(Continued)

FOREIGN PATENT DOCUMENTS

| JP | 7245692 | 9/1995 |
|---|---|---|
| JP | 8167936 | 6/1996 |

(Continued)

OTHER PUBLICATIONS

Cisco ATA 186 and Cisco ATA 188 Analog Telephone Adaptor Adminstrator's Guide (SIP), Text Part No. OL-3410-01, 2003, pp. 19-28, 35-73, 165-172.*

(Continued)

*Primary Examiner* — Hilina S Kassa

(57) ABSTRACT

A communication terminal apparatus includes a network facsimile device having network functions, and an SIP adapter device connected to the network facsimile device to enable communication based on Session Initiation Protocol SIP for communication control. The SIP adapter device has a first IP telephone number for use in first communication defined as communication performed between a plurality of communication terminal apparatuses and a second IP telephone number for use in second communication defined as communication performed by deeming a transmission signal as a voice signal. The SIP adapter device comprises a controller for causing the network facsimile device, according to a result of selection by the network facsimile device, to implement either the first communication by using the first IP telephone number or the second communication by means of a voice coder/decoder by using the second IP telephone number.

10 Claims, 3 Drawing Sheets

U.S. PATENT DOCUMENTS

| | | | |
|---|---|---|---|
| 2003/0164986 A1* | 9/2003 | Boire-Lavigne et al. | 358/400 |
| 2003/0193696 A1* | 10/2003 | Walker et al. | 358/402 |
| 2004/0184110 A1* | 9/2004 | Maei et al. | 358/400 |
| 2005/0036167 A1* | 2/2005 | Atsumi | 358/1.15 |
| 2005/0220082 A1* | 10/2005 | Toyoda | 370/352 |
| 2006/0028692 A1* | 2/2006 | Kajiwara | 358/402 |
| 2006/0153242 A1* | 7/2006 | Krause et al. | 370/493 |
| 2006/0184676 A1* | 8/2006 | Tanimoto | 709/227 |
| 2007/0189266 A1* | 8/2007 | Izumi et al. | 370/352 |
| 2007/0247669 A1* | 10/2007 | Iwai et al. | 358/400 |
| 2007/0258111 A1* | 11/2007 | Ooizumi | 358/402 |
| 2007/0291301 A1* | 12/2007 | Ozawa et al. | 358/1.15 |

FOREIGN PATENT DOCUMENTS

| | | |
|---|---|---|
| JP | 2003309701 A | 10/2003 |
| JP | 2004032288 | 1/2004 |
| JP | 2004147244 A | 5/2004 |
| JP | 2006157120 A | 6/2006 |

OTHER PUBLICATIONS

Japan Office Action dated Oct. 22, 2008 for JP Patent Application No. 2006-258245.

* cited by examiner

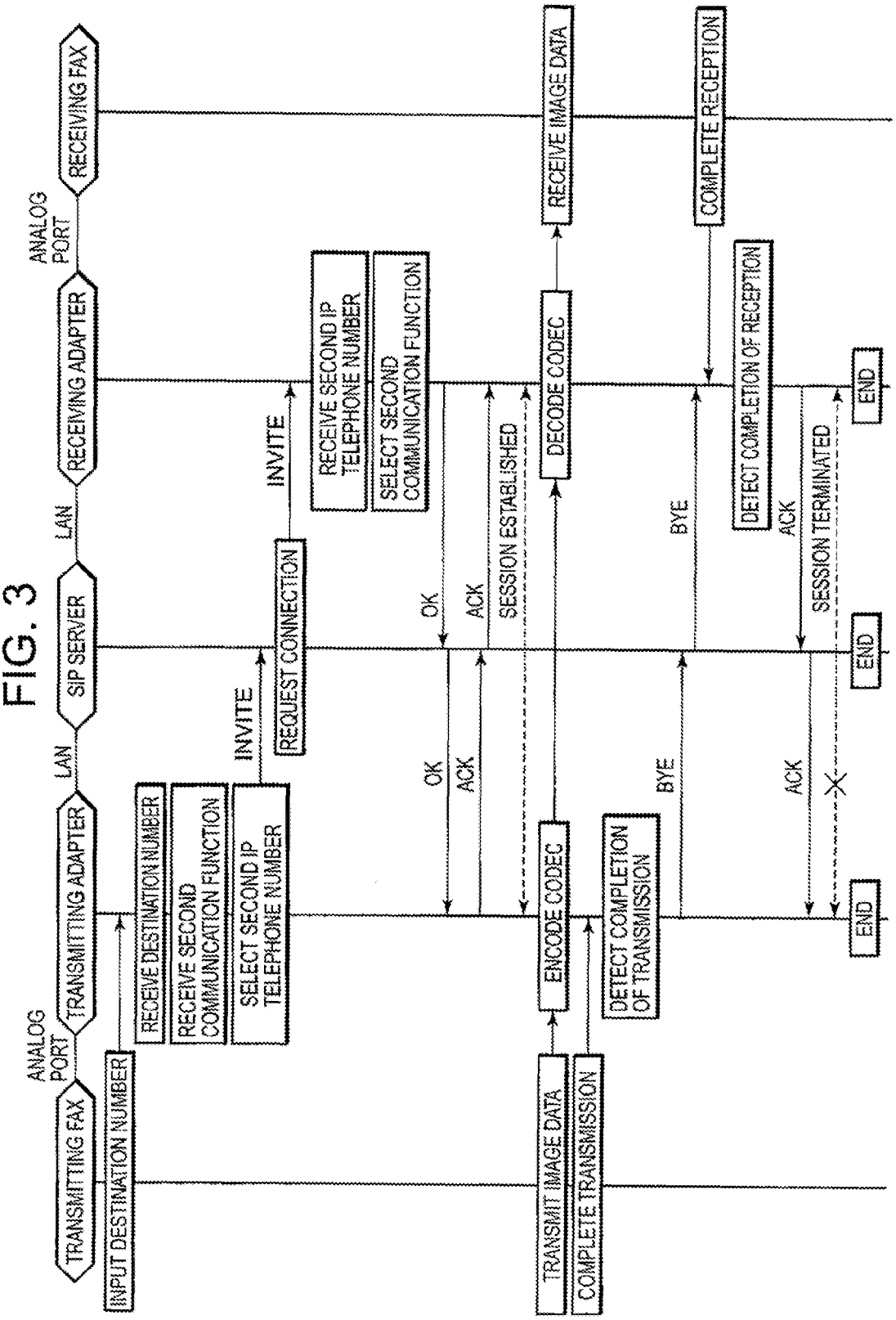

COMMUNICATION TERMINAL APPARATUS AND FACSIMILE COMMUNICATION METHOD

This application is based upon and claims the benefit of priority from Japanese patent application No. 2006-258245, filed on Sep. 25, 2006, the disclosure of which is incorporated herein in its entirety by reference.

BACKGROUND OF THE INVENTION

1. Field of the Invention

The present invention relates to a communication terminal apparatus provided with a Session Initiation Protocol (hereafter, abbreviated as "SIP") adapter device which establishes a session based on SIP in cooperation with an SIP server to enable facsimile communication by way of an Internet protocol (hereafter, abbreviated as "IP") network, and also relates to a facsimile communication method.

2. Description of the Related Art

There are known related art documents disclosing techniques relating to an adapter device for use in a communication terminal apparatus. For example, Japanese Laid-Open Patent Publication No. 2004-32288 (Document 1) proposes a communication adapter device for use in an IP telephone set. This communication adapter device enables a user to connect his/her IP telephone set to destination communication equipment, while selecting either via an Internet network or via a conventional subscriber network through a predetermined operation on the IP telephone set. The communication adapter device is also able to allow the user as a caller to confirm a type of the currently used network after establishing connection to the destination communication equipment. For this purpose, the communication adapter device has network selection means for selecting a network to be used for communication with other destination communication equipment based on information indicating a telephone number input through external communication equipment, and communication control means connected to the destination communication equipment based on the telephone number via the selected network to control the communication. The communication adapter device further has coder-decoder (hereafter, abbreviated as "CODEC") means for converting an analog voice signal to a digital signal or converting a digital input signal to an analog signal.

Japanese Laid-Open Patent Publication No. H7-245692 (Document 2) proposes a communication adapter device for use in a facsimile terminal, which is suitable for connection between a frame-relay network and a plurality of facsimile terminals. The communication adapter device has an RAM (random access memory) which stores an accommodated terminal information table for storing management information for managing accommodated terminals, and a destination identification table for storing information of a destination terminal connected via a frame-relay network.

Japanese Laid-Open Patent Publication No. H8-167936 (Document 3) proposes a mobile phone which is designed to have two different telephone numbers so that these telephone numbers are switchably used for respective different purposes, and with restrictions on conversation with the switched telephone number. The mobile phone has means for registering the two telephone numbers in association with various data including available areas where sending and receiving calls with the respective two telephone numbers are permitted, times and dates of use, and destination telephone numbers, and means for determining, when a call is sent or received with a selected telephone number, whether or not the data conditions are satisfied in correspondence with the telephone number.

There have been proposed facsimile devices having network functions (hereafter, referred to as the "network facsimile devices"), and these network facsimile devices employ a transmission/reception method as described below. When performing facsimile transmission/reception on a network, a mail address of a receiving network facsimile device is input on a transmitting network facsimile device, and data is transmitted to a mail server by using an Internet FAX (facsimile) service. The receiving network facsimile device then receives the data from the mail server with Post Office Protocol (hereafter, abbreviated as "POP") 3 or Internet Message Access Protocol (hereafter, abbreviated as "IMAP"). As is well known, both POP 3 and IMAP are protocols for receiving electronic mails from a server storing the electronic mails on Internet or intranet.

In addition to the transmission/reception method described above, there has been proposed a method to enable transmission and reception with Direct Simple Mail Transfer Protocol (hereafter, abbreviated as "direct SMTP") by inputting an IP address or a host name of a receiving network facsimile device on a transmitting network facsimile device. The direct SMTP is a communication method in which a receiving network facsimile device has a SMTP server function so that transmission and reception with SMTP are possible without involving a mail server.

However, the transmission/reception method and communication method as described above which use identification codes (for example, mail addresses, IP addresses, or host names) in addition to publicly well known telephone numbers, require storage or management of these identification codes. This causes users to feel troublesomeness and inconvenience.

It is therefore desired to make it possible to access an SIP server or the like present on a network and to perform conversion between a telephone number and an IP address so that an image can be transmitted to a desired destination only by inputting the telephone number. Additionally, it is desired to enable a network facsimile device, namely a network image communication function and an analog facsimile communication function to fully exhibit these functions.

SUMMARY OF THE INVENTION

It is an object of the present invention to provide a communication terminal apparatus having an SIP adapter device suitable for use in a network facsimile device capable of satisfying the desires as described above.

It is another object of the present invention to provide a facsimile communication method using the communication terminal apparatus described above.

A communication terminal apparatus according to an aspect of the present invention includes a network facsimile device having network functions, and an SIP adapter device connected to the network facsimile device via an analog port to enable communication based on Session Initiation Protocol SIP for communication control. The SIP adapter device comprises a circuit unit including a voice coder/decoder for converting an analog facsimile signal received from the network facsimile device via the analog port into a packet. The SIP adapter device further comprises a memory unit in which there are preliminarily registered a first IP telephone number for use in first communication defined as communication performed between a plurality of communication terminal apparatuses and a second IP telephone number for use in second communication defined as communication performed by deeming a transmission signal as a voice signal. The SIP adapter device still further comprises a controller for causing the network facsimile device according to a result of selection by the network facsimile device, to implement either the first communication by using the first IP telephone number or the second communication by means of the voice coder/decoder by using the second IP telephone number.

According to another aspect of the present inventions a facsimile communication method is provided. In the facsimile communication method, a network facsimile device having network functions performs communication under the control of an SIP adapter device connected to the network facsimile device via an analog port to enable communication based on Session Initiation Protocol SIP for communication control. The SIP adapter device is caused to hold a first own IP telephone number for use in first communication defined as communication performed between a plurality of communication terminal apparatuses and a second IP telephone number for use in second communication defined as communication performed by deeming a transmission signal as a voice signal. The SIP adapter device further causes the network facsimile device, according to a result of selection by the network facsimile device, to implement either the first communication by using the first IP telephone number or the second communication by means of a voice coder/decoder by using the second IP telephone number.

In addition, it is desirable that the first communication is Peer-to-Peer communication, and the second communication is Fax over IP communication.

Specifically, the communication terminal apparatus according to the present invention includes a network facsimile device and an SIP adapter device connected to the network facsimile device through an analog port. The communication terminal apparatus realizes the following two functions in the single SIP adapter device by utilizing analog facsimile communication function resources that the network facsimile device possesses.

1. Direct SMTP communication function is to perform Peer-to-Peer communication (first communication) with a predetermined format such as SMTP after identification of IP addresses of the transmitting and receiving parties based on SIP; and 2. Fax over IP communication (second communication) function is to perform communication by converting an analog facsimile signal into a packet after identification of IP addresses of the transmitting and receiving parties based on SIP.

This makes it possible to fully utilize the communication functions that the network facsimile device possesses, and to provide image communication not only for a receiving apparatus having the same functions as described above but also for a conventional receiving apparatus having a general-purpose analog facsimile communication apparatus, for example. Thus, the user is allowed to select either one of the two communication methods to perform communication with the receiving end with the use of a single network facsimile device.

BRIEF DESCRIPTION OF THE DRAWINGS

FIG. 3 is a diagram for explaining control procedures when Fax over IP communication is performed by the communication terminal apparatus shown in FIG. 1.

DESCRIPTION OF THE EXEMPLARY EMBODIMENTS

Features of an SIP adapter device constituting a principal part of a communication terminal apparatus according to the present invention can be summarized as follows.

The SIP adapter device according to the present invention is for providing image communication in an IP network (IP telephone network) using SIP when image communication is performed with the use of a network facsimile device. The SIP adapter device includes a memory in which two own IP telephone numbers. The SIP adapter device further realizes the following two, first and second communication functions by using a common SIP communication control portion. The term "SIP" as used herein means a type of call control protocols used in Internet telephones or the like with the application of VoIP. The term "VoIP" stands for Voice over Internet protocol used for transmitting and receiving voice data with the use of a TCP/IP network such as Internet or Intranet. Further, the term "TCP/IP" stands for transmission control protocol/Internet protocol typically used in Internet and intranet.

1. The first communication function is a direct SMTP communication function to perform Peer-to-Peer communication with a predetermined format such as SMTP after identification of IP addresses of both the own and destination stations with the use of SIP. The term "Peer-to-Peer communication" as used herein means a communication mode using Internet in which a plurality of communication terminals directly communicate with each other.

2. The second communication function is a Fax over IP communication function to perform communication by converting an analog facsimile signal into a packet after identification of IP addresses of both the own and destination stations with the use of SIP. The term "Fax over IP communication" as used herein means a communication mode to perform communication by converting digital data (transmission signal) into analog data and deeming the same as a voice signal.

These two communication functions are enabled to be realized by a single SIP adapter device, whereby both the network image communication function and the analog facsimile communication function possessed by a network facsimile device connected so as to form a pair with the SIP adapter device can be fully accommodated in an IP network by means of the single SIP adapter device.

Figure 1:
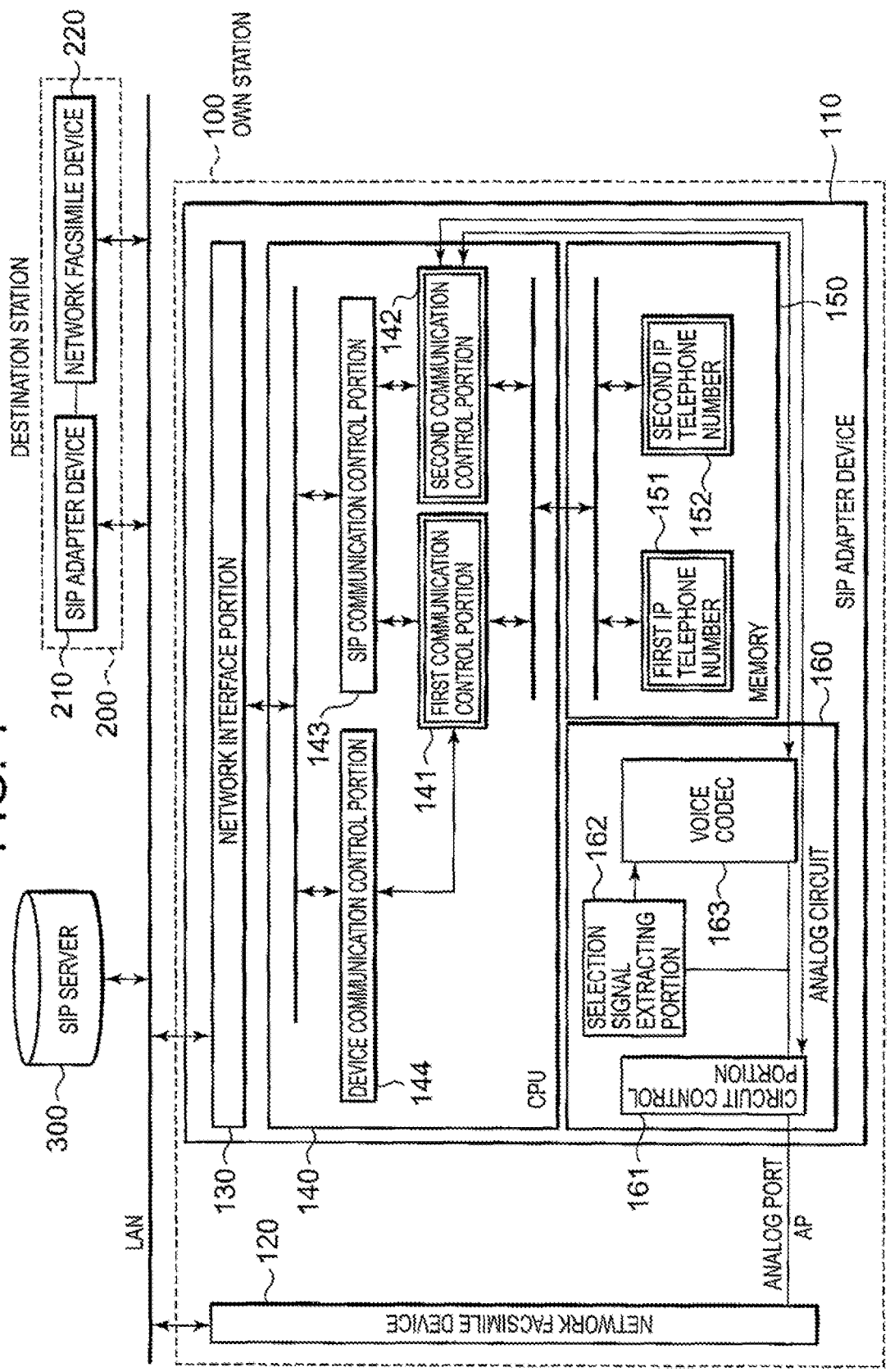
FIG. 1 is a diagram showing configuration of a communication terminal apparatus according to an exemplary embodiment of the present invention.

FIG. 1 shows an example of configuration of an SIP adapter device for realizing the functions described above according to an exemplary embodiment of the present invention, and an example of arrangement thereof on a local area network (LAN).

FIG. 1 shows an example in which an own station 100, that is a communication terminal apparatus, is composed of an SIP adapter device 110 and a network facsimile device 120 forming a pair with the SIP adapter device 110. A destination station 200, that is also a communication terminal apparatus, is composed of an SIP adapter device 210 and a network facsimile device 220 forming a pair with the SIP adapter device 210. Hereafter the network facsimile devices 110 and 220 shall be referred to in short as the facsimile devices 110 and 220, respectively.

The SIP adapter device 110 is composed of a network interface portion (network interface means) 130, a CPU (Central Processing Unit) (controller or control means) 140, a memory (memory unit or memory means) 150, and an analog circuit (circuit unit or circuit means) 160.

The network interface portion 130 connects the SIP adapter device 110 to the local area network LAN. This means that the network interface portion 130 physically performs network control and data communication between the SIP adapter device 110 and the SIP server 300 or the destination station 200 connected to the local area network LAN, and between the facsimile device 120 and the SIP adapter device 110 forming a pair with each other.

The CPU 140 is formed by a central processing unit which performs overall control of the SIP adapter device 110, while also performing various types of control for the communication via the network interface portion 130. In FIG. 1, the functional configuration of the CPU 140 is shown in a block diagram. The CPU 140 includes an SIP communication control portion 143 for controlling the IP network communication using SIP. The CPU 140 further includes a first communication control portion 141 for implementing the direct SMTP communication function described above by means of the SIP communication control portion 143, and a device communication control portion 144 for communication with the facsimile device 120 with which the device communication control portion 14 forms a pair when performing the direct SMTP communication. The CPU 140 further includes a second communication control portion 142 for implementing the Fax over IP communication function described above with the use of the SIP communication control portion 143.

The memory 150 is a storage device for storing various types of registration information and computing results of the CPU 140. The memory 150 includes a storage area 151 in which a first IP telephone number to be used as an own number when performing the direct SMTP communication described above is prestored, and a storage area 152 in which a second IP telephone number to be used as an own number when performing the Fax over IP communication is prestored. The first and second IP telephone numbers are provided by the SIP server 300.

The analog circuit 160 is to accommodate the analog facsimile function of the facsimile device 120. The analog circuit 160 includes a line control portion 161 for monitoring the DC power feeding to an analog port AP for connection to the facsimile device 120 and the closing and opening of the line, and for generating a call signal for calling the facsimile device 120. The analog circuit 160 further includes a selection signal extracting portion 162 for extracting an IP telephone number of a destination station from a selection signal transmitted by the facsimile device 120 based on the user's selection operation, and a voice CODEC 163 for converting an analog signal from the facsimile device 120 into packets.

There are registered in the facsimile device 120, not only the numbers of network facsimile devices having the same functions as the facsimile device 120 itself but also the numbers of facsimile devices having general-purpose analog facsimile communication functions. Therefore, when the user selects either the direct SMTP communication or the Fax over IP communication on the facsimile device 120 prior to performing facsimile transmission the user is allowed to accomplish this selection with a flip of a button or the like by the fact that the numbers are preliminarily registered in combination with the types of communication.

The destination station 200 also has an SIP adapter device 210 and a facsimile device 220 similar to the SIP adapter device 110 and the facsimile device 120 of the own station 100 described above.

Figure 2:
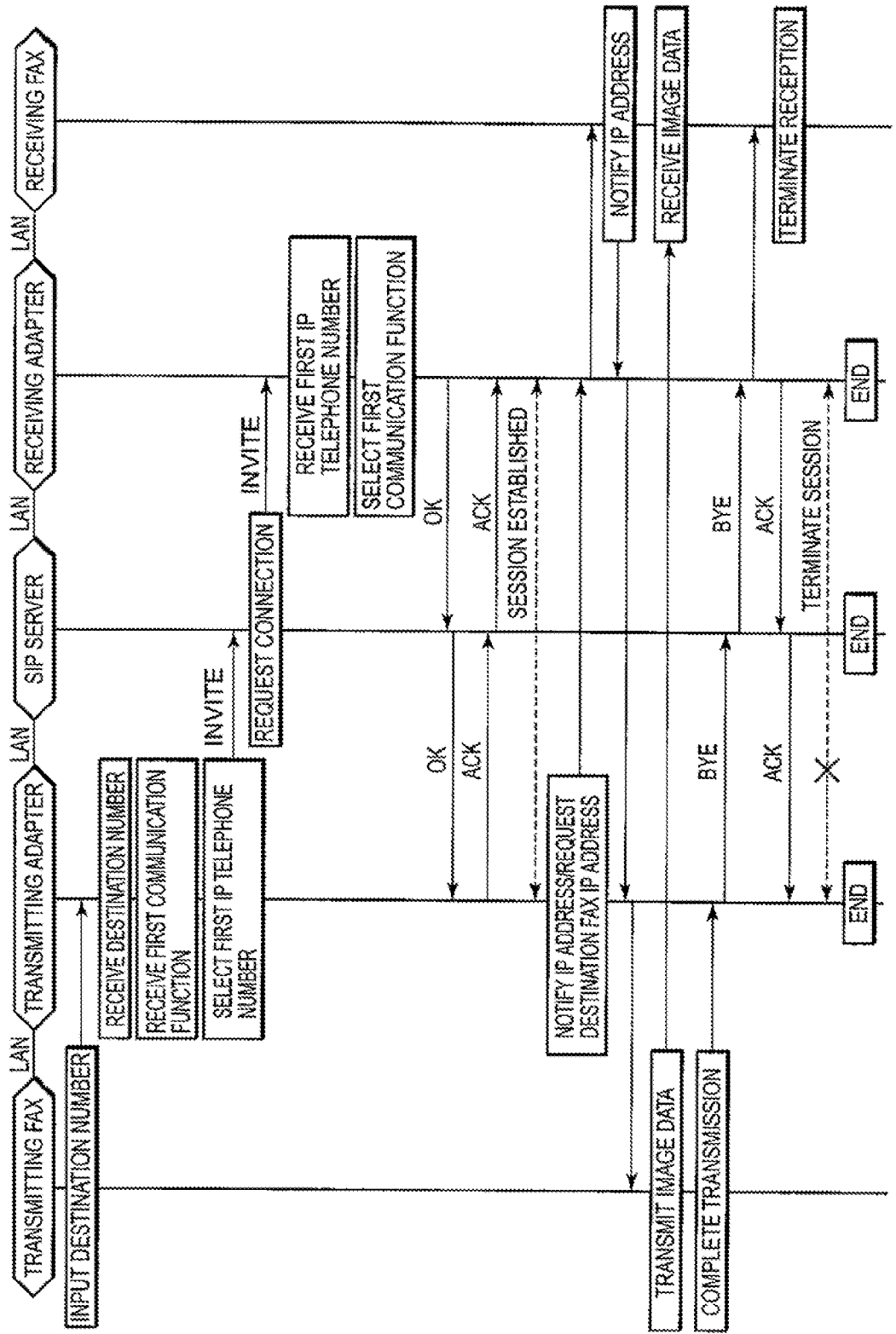
FIG. 2 is a diagram for explaining control procedures when direct SMTP communication is performed by the communication terminal apparatus shown in FIG. 1.

With reference to FIGS. 2 and 3, description will be made of examples of various types of communication control operation using an SIP adapter device according to an exemplary embodiment of the present invention.

FIG. 2 shows control procedures for the direct SMTP communication to perform Peer-to-Peer communication using a predetermined format such as SMTP after the SIP adapter device according to the exemplary embodiment of the present invention identifying the IP addresses of both the own station 100 and the destination station 200 with the use of SIP. In FIG. 2, the SIP adapter device 110 and the facsimile device 120 are indicated as "Transmitting Adapter" and "Transmitting FAX", respectively. The SIP adapter device 210 and the facsimile device 220 are indicated as "Receiving Adapter" and "Receiving FAX", respectively. This means that the own station 100 performs transmitting-end control on the SIP adapter device according to the present invention, while the destination station 200 performs receiving-end control on the SIP adapter device according to the present invention.

Among various communication control operations described below, those operations illustrated in association with the transmitting adapter or the receiving adapter are realized by the CPU 140 implementing commands of a program (software). The program is stored in the memory 150 or any other recording medium readable by the CPU 140, such as a magnetic disk, optical disk, or semiconductor memory. Alternatively, the program may be implemented by being downloaded into the CPU 140 via a communication line without involving any recording medium. This also applies to the Fax over IP communication control operations to be later described with reference to FIG. 3.

The own station 100 is formed by a pair of the SIP adapter device 110 and the facsimile device 120, while the destination station 200 is formed by a pair of the SIP adapter device 210 and the facsimile device 220, as described with reference to FIG. 1. These communication terminal apparatuses are connected to the SIP server 300 via an IP network, which is herein a local area network LAN.

When the selection operation including the input of an IP telephone number of a destination (destination station) is performed on the transmitting FAX (facsimile device 120) to initiate facsimile transmission by the direct SMTP communication method, a transmission request and the destination IP telephone number are notified to the transmitting adapter (SIP adapter device 110) via the network. Upon receiving the transmission request from the transmitting FAX via the network, the transmitting adapter activates the first communication control portion 141 corresponding to the direct SMTP communication method, and issues a connection request to the SIP server 300 while selecting, as an own number, the first IP telephone number registered in the storage area 151 of the memory 150. The SIP server 300 is thus supplied with the destination IP telephone number and the first IP telephone number together with the connection request.

Upon receiving the connection request from the transmitting adapter based on the preliminarily registered first IP telephone number, the SIP server 300 extracts the destination IP telephone number, and issues a connection request to a receiving adapter (SIP adapter device 210) corresponding to the extracted destination IP telephone number.

Upon receiving the connection request from the SIP server 300, the receiving adapter extracts the destination IP telephone number added to the connection request, and checks the extracted destination IP telephone number against IP telephone numbers preliminarily registered in a memory (similar to the memory 150 shown in FIG. 1). If the check confirms that the destination IP telephone number matches the registered first IP telephone number, the receiving adapter activates a first communication control portion (similar to the first communication control portion 141 of FIG. 1) to prepare for the direct SMTP communication. The receiving adapter then returns a signal representing a response to the SIP server 300. When the own station 100 and the destination station 200 have mutually recognized each other as the communication partner, a communication session with the IP network is established to enable the direct SMTP communication between the transmitting adapter and the receiving adapter.

Prior to the direct SMTP communication, the SIP adapter devices 110 and 210 of the own station 100 and the destination station 200 exchange the IP addresses of the facsimile devices forming a pair therewith (facsimile devices 120 and 220) and notify the IP addresses to the respective facsimile devices 120 and 220. Upon receiving the each other's IP addresses, the facsimile devices 120 and 220 start the Peer-to-Peer communication by using the received IP addresses and directly transmit image data between the transmitting facsimile device 120 and the receiving facsimile device 220.

Upon completion of the transmission of the image data, the transmitting facsimile device 120 notifies the completion of the transmission to the SIP adapter device 110 on the transmitting end. Upon receiving the notification of the completion of the transmission, the transmitting SIP adapter device 110 proceeds to the procedure to terminate the communication with the receiving SIP adapter device 210, and the communication is terminated.

FIG. 3 shows control procedures for the Fax over IP communication to perform communication by converting an analog facsimile signal into packets after the SIP adapter device according to the present invention identifying the IP addresses of both the own and destination stations with the use of SIP.

Also in FIG. 3, the SIP adapter device 110 and the facsimile device 120 on the transmitting end are indicated as a transmitting adapter and a transmitting FAX, respectively, while the SIP adapter device 210 and the facsimile device 220 on the receiving end are indicated as a receiving adapter and a receiving FAX respectively. This means that the own station 100 shown in FIG. 1 performs transmitting-end control on the SIP adapter device according to the present invention, while the destination station 200 performs receiving end control on the SIP adapter device according to the present invention.

The own station and the destination station are each formed by a pair of an SIP adapter device and a facsimile device. The facsimile device and the SIP adapter device within each station are connected to each other through a special analog port AP (FIG. 1), and the respective SIP adapter devices are connected to the SIP server 300 via a network.

When the selection operation including the input of a destination IP telephone number is performed on the transmitting FAX (facsimile device 120) to initiate facsimile transmission by the Fax over IP communication method, a transmission request and the destination IP telephone number are notified to the transmitting adapter (SIP adapter device 110) via the analog port AP. Upon receiving the transmission request from the transmitting FAX via the analog port AP, the transmitting adapter activates the second communication control portion 142 corresponding to the Fax over IP communication and issues a connection request to the SIP server 300 while selecting, as an own number the second IP telephone number registered in the storage area 152 of the memory 150. The SIP server 300 is thus supplied with the destination IP telephone number and the second IP telephone number together with the connection request.

Upon receiving the connection request from the transmitting adapter based on the preliminarily registered second IP telephone number, the SIP server 300 extracts the destination IP telephone number and issues a connection request to a receiving adapter (SIP adapter device 210) corresponding to the extracted destination IP telephone number. Upon receiving the connection request from the SIP server 300, the receiving adapter extracts the destination IP telephone number and checks the extracted destination IP telephone number against IP telephone numbers preliminarily registered in a memory (similar to the memory 150 of FIG. 1). If the check confirms that the destination IP telephone number matches the registered second IP telephone number, the receiving adapter activates a second communication control portion (similar to the second communication control portion 142 shown in FIG. 1) to prepare for the Fax over IP communication.

The receiving adapter then returns a signal representing a response to the SIP server 300. When the own station 100 and the destination station 200 have mutually recognized each other as the communication partner, a communication session with the IP network is established to enable the direct SMTP communication between the SIP adapter devices 110 and 210.

Prior to performing communication by the Fax over IP communication method, the SIP adapter device 110 of the own station 100 encodes an analog facsimile signal transmitted by the facsimile device 120 connected to the analog port AP with the use of the voice CODEC 163 in the analog circuit 160 to convert the same into packets, and transmits the packets to the destination SIP adapter device 210 on the networks. On the other hand, the SIP adapter device 210 of the destination station 200 decodes the packets received from the SIP adapter device 110 with a voice CODEC (similar to the voice CODEC 163 show in FIG. 1) to convert the same into an analog facsimile signal, and transmits the analog facsimile signal to the facsimile device 220 connected to an analog port (similar to the analog port AP shown in FIG. 1).

Upon completion of the analog facsimile communication, the transmitting FAX notifies the transmitting adapter of the completion of the transmission through the analog port AP. Upon receiving the notification of the completion of the transmission, the transmitting adapter proceeds to the procedure to terminate the communication with the receiving adapter via the IP network, and the communication is terminated.

Operations for the direct SMTP communication and the Fax over IP communication are thus realized by the communication control procedures as described with reference to FIGS. 2 and 3. It should be appreciated that, in the Fax over IP communication, image communication is possible not only with a specific destination station having the same functions as the own station 100 of the present invention but also with a conventional destination station having general-purpose analog facsimile communication means.

In the communication terminal apparatus according to the present invention, the SIP adapter device causes a network facsimile device to implement two different communication functions of Peer-to-Peer communication and Fax over IP communication with the use of a common SIP communication control portion, while selectively using the communication methods by using two preliminarily registered IP telephone numbers of the own station. The two different communication functions are thus enabled to be realized by a single SIP adapter device. In this manner all the communication functions that the network facsimile device possesses can be fully accommodated in the IP network, while at the same time, image communication can be provided not only for specific destination stations having the same functions as the network facsimile device but also for conventional destination stations having general-purpose facsimile communication means.

What is claimed is:

1. A communication terminal apparatus including a network facsimile device having network functions and directly connected to an IP telephone network, and a SIP adapter device connected to the IP telephone network and to the network facsimile device via an analog port to enable communication based on Session Initiation Protocol SIP for communication control, the SIP adapter device comprising:
  a circuit unit including a voice coder/decoder for converting an analog facsimile signal received from the network facsimile device via the analog port into a packet;
  a memory unit in which there are preliminarily registered a first own IP telephone number for use in Peer-to-Peer communication defined as communication performed between a plurality of communication terminal apparatuses and a second own IP telephone number for use in Fax over IP communication defined as communication performed by deeming a transmission signal as a voice signal; and
  a controller for causing the network facsimile device, when a Peer-to-Peer communication request is received from the network facsimile device via the IP telephone network, to implement the Peer-to-Peer communication with the IP telephone network by using the first own IP telephone number and causing the network facsimile device, when a Fax over IP communication request is received from the network facsimile device via the analog port, to implement the Fax over IP communication by means of the voice coder/decoder by using the second own IP telephone number,
  wherein the first own IP telephone number is a first IP telephone number of the SIP adapter device, and the second own IP telephone number is a second IP telephone number of the SIP adapter device, such that the SIP adapter device has two IP telephone numbers.

2. The communication terminal apparatus according to claim 1, wherein the communication terminal apparatus can be connected to a destination communication terminal apparatus via the IP telephone network connected to a SIP server, and the SIP adapter device further comprises a network interface unit for connecting the SIP adapter device to the network facsimile device, the SIP server, and the destination communication terminal apparatus via the IP telephone network.

3. The communication terminal apparatus according to claim 2, wherein when the network facsimile device selects the Peer-to-Peer communication, the controller implements direct SMTP communication with Simple Mail Transfer Protocol SMTP as the Peer-to-Peer communication after identifying the IP addresses of the communication terminal apparatus and the destination communication terminal apparatus according to Session Initiation Protocol SIP, whereas when the network facsimile device selects the Fax over IP communication, the controller implements the Fax over IP communication by converting the analog facsimile signal into a packet after identifying the IP addresses of the communication terminal apparatus and the destination communication terminal apparatus according to Session Initiation Protocol SIP.

4. The communication terminal apparatus according to claim 3, wherein the controller comprises:
  a SIP communication control portion for controlling IP network communication according to Session Initiation Protocol SIP;
  a first communication control portion for causing the SIP communication control portion to implement the Peer-to-Peer communication;
  a device communication control portion for performing communication with the network facsimile device via the IP telephone network during the Peer-to-Peer communication; and
  a second communication control portion for causing the SIP communication control portion to implement the Fax over IP communication.

5. A facsimile communication method in which a network facsimile device having network functions and directly connected to an IP telephone network performs communication under the control of a SIP adapter device connected to the IP telephone network and to the network facsimile device via an analog port to enable communication based on Session Initiation Protocol SIP for communication control, wherein:
  the SIP adapter device is caused to hold a first own IP telephone number for use in Peer-to-Peer communication defined as communication performed between a plurality of communication terminal apparatuses and a second own IP telephone number for use in Fax over IP communication defined as communication performed by deeming a transmission signal as a voice signal; and
  the SIP adapter device causes the network facsimile device, when a Peer-to-Peer communication request is received from the network facsimile device via the IP telephone network, to implement the Peer-to-Peer communication with the IP telephone network by using the first own IP telephone number and causing the network facsimile device, when a Fax over IP communication request is received from the network facsimile device via the analog port, to implement the Fax over IP communication by means of a voice coder/decoder by using the second own IP telephone number,
  wherein the first own IP telephone number is a first IP telephone number of the SIP adapter device, and the second own IP telephone number is a second IP telephone number of the SIP adapter device, such that the SIP adapter device has two IP telephone numbers.

6. The facsimile communication method according to claim 5, wherein when the network facsimile device selects the Peer-to-Peer communication, the controller implements direct SMTP communication with Simple Mail Transfer Protocol SMTP as the Peer-to-Peer communication after identifying the IP addresses of the communication terminal apparatus and the destination communication terminal apparatus according to Session Initiation Protocol SIP, whereas when the network facsimile device selects the Fax over IP communication, the controller implements the Fax over IP communication by converting an analog facsimile signal into a packet after identifying the IP addresses of the communication terminal apparatus and the destination communication terminal apparatus according to Session Initiation Protocol SIP.

7. The facsimile communication method according to claim 6, wherein the network facsimile device and the SIP adapter device on the transmitting end are connected to the network facsimile device and the SIP adapter device on the receiving end via the IP telephone network connected to a SIP server, and
  the direct SMTP communication comprises:
    a step in which when facsimile transmission is initiated by the network facsimile device on the transmitting end after an operation of selecting direct SMTP communication including input of a destination IP telephone number is performed, the SIP adapter device on the transmitting end receives a transmission request as the Peer-to-Peer communication request and the destination IP telephone number from the network facsimile device on the transmitting end through the IP telephone network;

a step in which upon receiving the transmission request, the SIP adapter device on the transmitting end selects the first own IP telephone number and issues a connection request to the SIP server;

a step in which upon receiving the connection request from the SIP adapter device on the transmitting end, the SIP server extracts the destination IP telephone number and issues a connection request to the SIP adapter device on the receiving end corresponding to the extracted destination IP telephone number; and a step in which upon receiving the connection request from the SIP server, the SIP adapter device on the receiving end extracts the destination IP telephone number to check the same against a preliminarily registered IP telephone number, and if the check confirms that the destination IP telephone number matches the preliminarily registered IP telephone number, the SIP adapter device on the receiving end returns a signal representing a response to the SIP server, and wherein a communication session is established on the network when the SIP adapter device on the transmitting end and the SIP adapter device on the receiving end recognize each other as the communication partner, and direct SMTP communication is performed between the SIP adapter device on the transmitting end and the SIP adapter device on the receiving end.

8. The facsimile communication method according to claim 6, wherein the Fax over IP communication comprises:

a step in which when facsimile transmission is initiated by the network facsimile device on the transmitting end after an operation of selecting Fax over IP communication including input of a destination IP telephone number is performed, the SIP adapter device on the transmitting end receives a transmission request as the Fax over IP communication request and the destination IP telephone number through the analog port;

a step in which upon receiving the transmission request, the SIP adapter device on the transmitting end selects the second own IP telephone number and issues a connection request to the SIP server;

a step in which upon receiving the connection request from the transmitting SIP adapter device, the SIP server extracts the destination IP telephone number and issues a connection request to the SIP adapter device on the receiving end corresponding to the extracted destination IP telephone number; and a step in which upon receiving the connection request from the SIP server, the SIP adapter device on the receiving end checks the destination IP telephone number against a preliminarily registered IP telephone number, and if the check confirms that the destination IP telephone number matches the preliminarily registered IP telephone number, the SIP adapter device on the receiving end returns a signal representing a response to the SIP server, and wherein a communication session is established on the network when the SIP adapter device on the transmitting end and the SIP adapter device on the receiving end recognize each other as the communication partner, and Fax over IP communication is performed between the SIP adapter device on the transmitting end and the SIP adapter device on the receiving end.

9. A communication terminal apparatus including a network facsimile device having network functions and directly connected to an IP telephone network, and a SIP adapter device connected to the IP telephone network and to the network facsimile device via an analog port to enable communication based on Session Initiation Protocol SIP for communication control, the SIP adapter device comprising:

circuit means including a voice coder/decoder for converting an analog facsimile signal received from the network facsimile device via the analog port into a packet;

memory means in which there are preliminarily registered a first own IP telephone number for use in Peer-to-Peer communication defined as communication performed between a plurality of communication terminal apparatuses and a second own IP telephone number for use in Fax over IP communication defined as communication performed by deeming a transmission signal as a voice signal; and control means for causing the network facsimile device, when a Peer-to-Peer communication request is received from the network facsimile device via the IP telephone network, to implement the Peer-to-Peer communication with the IP telephone network by using the first own IP telephone number and causing the network facsimile device, when a Fax over IP communication request is received from the network facsimile device via the analog port, to implement the Fax over IP communication by means of the voice coder/decoder by using the second own IP telephone number, wherein the first own IP telephone number is a first IP telephone number of the SIP adapter device, and the second own IP telephone number is a second IP telephone number of the SIP adapter device, such that the SIP adapter device has two IP telephone numbers.

10. A SIP adapter device connected via an analog port to a network facsimile device having network functions and connected to an IP telephone network to enable communication based on Session Initiation Protocol SIP for communication control, the network facsimile device being directly connected to the IP telephone network, the SIP adapter device comprising:

a circuit unit including a voice coder/decoder for converting an analog facsimile signal received from the network facsimile device via the analog port into a packet;

a memory unit in which there are preliminarily registered a first own IP telephone number for use in Peer-to-Peer communication defined as communication performed between a plurality of communication terminal apparatuses and a second own IP telephone number for use in Fax over IP communication defined as communication performed by deeming a transmission signal as a voice signal; and a controller for causing the network facsimile device, when a Peer-to-Peer communication request is received from the network facsimile device via the IP telephone network, to implement the Peer-to-Peer communication with the IP telephone network by using the first own IP telephone number and causing the network facsimile device, when a Fax over IP communication request is received from the network facsimile device via the analog port, to implement the Fax over IP communication by means of the voice coder/decoder by using the second own IP telephone number, wherein the first own IP telephone number is a first IP telephone number of the SIP adapter device, and the second own IP telephone number is a second IP telephone number of the SIP adapter device, such that the SIP adapter device has two IP telephone numbers.

* * * * *